Sept. 25, 1962 R. HOCHSCHILD 3,056,081
ELECTROMAGNETIC TESTING
Filed June 22, 1959 2 Sheets-Sheet 1

INVENTOR.
RICHARD HOCHSCHILD
BY
Christie, Parker & Hale
ATTORNEYS.

Sept. 25, 1962   R. HOCHSCHILD   3,056,081
ELECTROMAGNETIC TESTING
Filed June 22, 1959   2 Sheets-Sheet 2

INVENTOR.
RICHARD HOCHSCHILD
BY
Christie, Parker & Hale
ATTORNEYS

United States Patent Office 3,056,081
Patented Sept. 25, 1962

3,056,081
ELECTROMAGNETIC TESTING
Richard Hochschild, Pasadena, Calif., assignor, by mesne assignments, to The Budd Company, Philadelphia, Pa., a corporation of Pennsylvania
Filed June 22, 1959, Ser. No. 822,044
5 Claims. (Cl. 324—37)

The present invention relates to the art of non-destructive testing of materials for non-uniformities by means of observing the interaction between the test material and a magnetic field, and has particular reference to improved methods and apparatus for distinguishing between different types of non-uniformities in the test material.

The need for more efficient and reliable methods for one-hundred percent inspection of manufactured parts for flaws, faulty properties and dimensional tolerances by means that will not destroy or injure the part is common to many industries. Electromagnetic methods of non-destructive testing potentially fulfill this need because they can be employed to perform the function of judgment in certain test applications, are compatible with automatic alarm, rejection and feed-back control circuits, and are fast.

Conventional electromagnetic testing involves the employment of a magnetically sensitive scanning device and cooperating electrical circuit. Typically, the test material is subjected to a varying magnetic field, which is modulated by the presence of non-uniformities in the test material. The scanning device picks up the modulated signal which is in turn amplified and demodulated by the cooperating electrical circuit, whereby there is produced an electrical signal having an amplitude dependent upon the interaction between the test material and the magnetic field.

Typically, a test material has different types of non-uniformities which compete for instrument response when the material is subjected to electromagnetic testing. For example, metal manufactured parts such as tubing, bars, wire and flat stock may have non-uniformities in the form of discontinuities, such as cracks, seams, inclusions and porosity; residual stresses; dimensional variations; variations in heat-treatment condition; changes in alloy composition; and, other variations. As the test material is scanned by the electromagnetic testing equipment, many of these conditions and others may vary at once and each affect the instrument output, and unless the test instrument can distinguish between the different types of non-uniformities, the test results are likely to be confused. The problem may be stated as that of suppressing in the instrument output the effect of various types of non-uniformities that are not of interest in order to uniquely indicate those non-uniformities which are of interest.

The methods heretofore proposed for suppressing the influences of certain non-uniformities, such as the methods relying upon harmonic distortion of the exciting wave form and those relying upon phase sensitive detectors, have been of limited application. None of these methods have been able to effectively suppress simultaneously more than two of the many possible types of non-uniformities, thereby leaving a considerable amount of uncertainty in interpreting the instrument output. Furthermore, the method of harmonic (distortion) analysis applies to ferromagnetic metals only, and the phase sensitive method of suppression is effective only over a limited amplitude of the non-uniformity because the phase shift characteristic of any given non-uniformity depends to some extent on the amplitude of the effect.

The present invention represents an improvement over the previous methods and apparatus and operates on a different principle, which is the recognition that different types of non-uniformities in a test material usually have different characteristic dimensions. By focusing the scanning device on an area of test material significantly narrower in the scanning direction than the larger of the two smallest characteristic dimensions to be distinguished, and by maintaining a predetermined scanning motion between the test material and the scanning device, the different types of non-uniformities in the test material introduce different predetermined frequencies in the output signal, which may be selectively filtered and indicated.

In terms of apparatus, the present invention contemplates means for subjecting the test material to a magnetic field, a magnetically sensitive scanning device and cooperating electrical circuit for producing an electrical signal having an amplitude dependent upon the interaction between the test material and the magnetic field, the scanning device being focused effectively upon an area of the test material significantly narrower in the scanning direction than the larger of the two smallest characteristic dimensions to be distinguished, means for maintaining a predetermined scanning motion between the test material and the scanning device so that different types of non-uniformities in the test material introduce different predetermined frequencies in said electrical signal, means for filtering said signal so as to suppress predetermined frequencies, and means for indicating the filtered signal.

In the preferred embodiment of the apparatus of the invention, the filtering means has at least two parallel filtering channels for suppressing predetermined frequencies, and the indicating means has separate indicating channels for receiving the output from the two filtering channels, whereby signals representative of different types of non-uniformities in the material under test may be indicated separately and at the same time.

The apparatus and method of the present invention will be better understood by reference to the accompanying drawings, in which.

Figure 1:
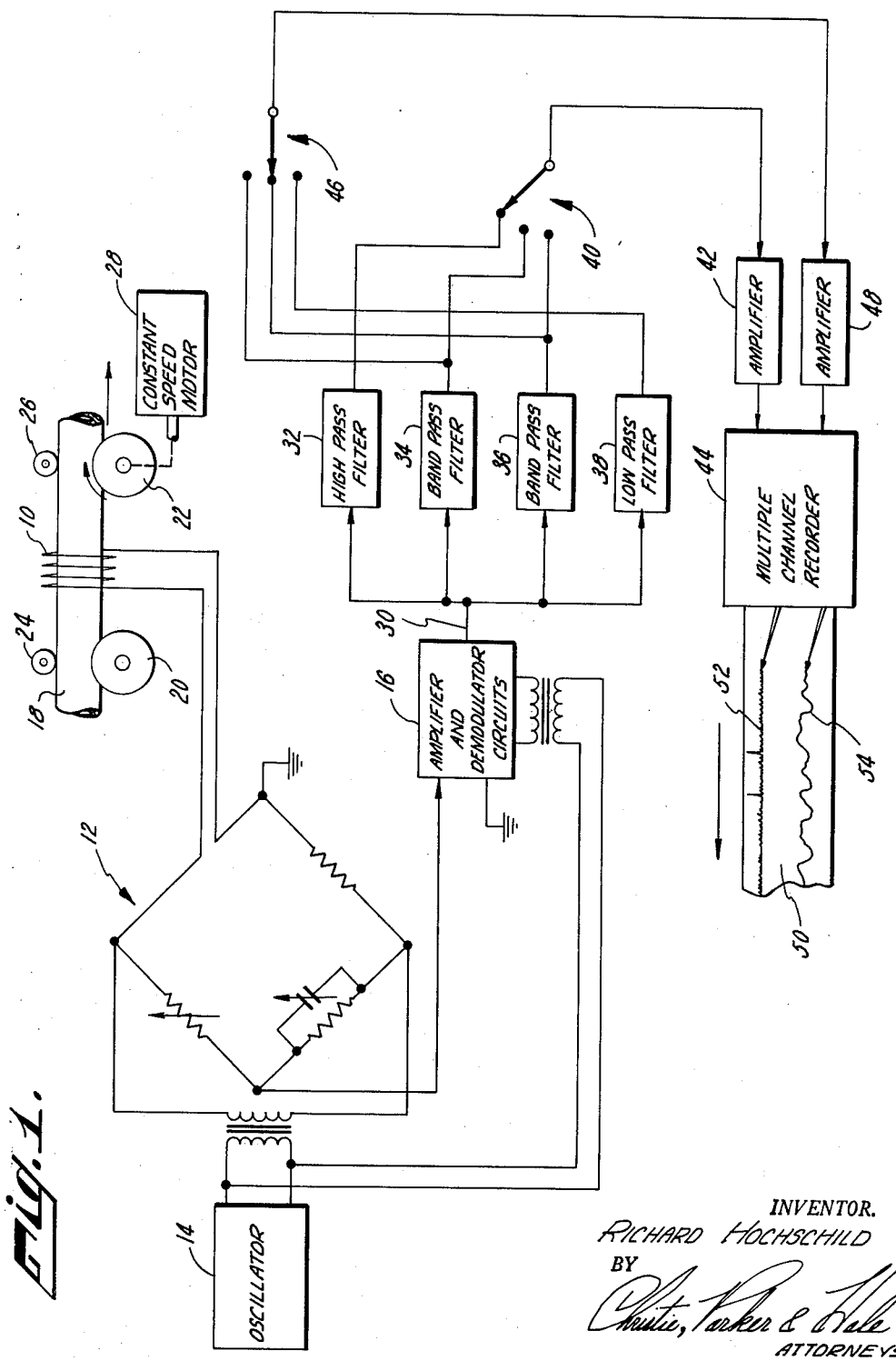
FIG. 1 is a schematic drawing illustrating the preferred embodiment of the apparatus of the present invention in operation.

Referring to FIG. 1, a magnetically sensitive scanning device in the form of a test coil 10 is connected in one arm of a bridge circuit 12. The test coil 10 is energized with an alternating signal supplied from an oscillator 14 across one pair of bridge terminals, and the output from the bridge is taken across the other pair of terminals and applied to conventional amplifier and demodulator circuits 16.

The test coil 10 surrounds typical test material in the form of a metallic tube 18. The tube 18 is supported on rollers 20, 22 against which it is urged by idlers 24, 26. The leading roller 22 is driven at a constant speed by a motor 28, whereby a predetermined scanning motion is maintained between the tube 18 and the test coil 10. The test coil produces a varying magnetic field which impinges on the pipe as it moves through the coil.

The bridge circuit 12, oscillator 14 and amplifier and demodulator circuit 16 taken together comprise a cooperating electrical circuit for producing an electrical signal on an output connection 30, this signal having an amplitude which varies in accordance with the interaction between the tube 18 and the field of the test coil 10. Conventionally, the amplifier and demodulator circuit 16 is an amplitude sensitive device so that the signal appearing at the output connection 30 is proportional to the amplitude modulation in the bridge output voltage.

The amplifier and demodulator circuit 16 may be a phase sensitive circuit similar to that shown in FIG. 1 of U.S. Patent 2,455,792 to Meunier, issued December 7, 1948. In this case the signal carried on the output connection 30 has an amplitude proportional to phase modulation in the bridge output signal brought about by different non-uniformities in the tube 18.

A plurality of filters 32, 34, 36 and 38 are coupled in parallel to the output connection 30, each filter being arranged to suppress different predetermined frequencies. For example the first filter 32 may be set to pass signal frequencies of one thousand cycles per second and greater, the second filter 34 may be set to pass signal frequencies of about one hundred cycles per second, the third filter 36 passing frequencies of about ten cycles per second and the fourth filter 38 passing frequencies of about one cycle per second and lower.

The first, second and third filters 32, 34, 36 are connected respectively to the contacts of a first selector switch 40, the common terminal of which is connected to an amplifier 42, the output from which in turn runs to one channel of a multiple channel recorder 44, which acts as an indicating means. The second, third and fourth filters 34, 36, 38 are connected to the respective contacts of a second selector switch 46, the common terminal of which is coupled to an amplifier 48, with the output of the amplifier running to a second channel of the multiple channel recorder 44. The circuit from the output connection 30, through the filters and through the first selector switch 40 and amplifier 42 accounts for a first filtering channel which lies in parallel with a second filtering channel defined by the circuit running from the output connection 30, through the filters and the second selector switch 46 and amplifier 48.

By means of the selector switch 40 in the first filtering channel, different predetermined frequencies in the output signal on the output connection 30 may be suppressed at the input to the amplifier 42, the output from which is indicated as a first trace 52 recorded on a moving chart 50 by the multiple channel recorder 44. Similarly, by means of the selector switch 46, different frequencies in the signal present on the output connection 30 may be suppressed at the input to the amplifier 48, the output from which appears as a second trace 54 separately recorded on the moving chart 50 at the same time as the first trace.

The basic principle employed in the method and apparatus of the present invention is that under proper conditions different types of non-uniformities in a test material produce characteristic modulating frequencies in the amplitude and phase of the test coil voltage, and by suppressing predetermined modulating frequencies, it is possible to suppress the influence of certain non-uniformities. This phenomenon results from the fact that the various types of non-uniformities significant in many test materials have a characteristic dimension in the material. For example, cracks and most other flaws are sharp local discontinuities. Internal stres zones are often due to the forming operation and tend to appear in cyclical patterns at close intervals on products such as rods and tubing. If the part was annealed to properly relieve stresses, the dimensions of the relieved areas may change slightly; i.e., the stress pattern in a tube may change into a similar pattern of diameter variations. Composition variations, if they exist to any extent, tend to be monotonic since for many products they trace back to segregation of impurities in the ingot. Thus, composition may vary gradually from one end of the piece of tubing to the other or from the edge to the center of a sheet of metal. Variations in heat treatment of parts may have a variety of special distributions, but they usually are not sharp since thermal conductivity tends to diffuse an overheated condition. Thus, a typical test material usually has characteristic non-uniformities which in turn normally have characteristic dimensions.

When relative motion exists between the tube 18 and test coil 10, the modulating frequencies created in the test coil 10 depend on the dimensions of the test coil, the velocity of the relative motion, and the characteristic dimensions in the tube 18 of the non-uniformities causing the modulation.

In metal tubing, rod, wire and sheet, certain non-uniformities have characteristic dimensions and, assuming a predetermined scanning speed, produce characteristic modulating frequencies. For example, discontinuities characteristically produce modulating frequencies of the order of one kilocycle and above at a scanning speed of sixty feet per minute. Residual stresses characteristically produce modulating frequencies of about one hundred cycles per second at a scanning speed of sixty feet per minute. At the same scanning speed, dimensional variations characteristically produce modulating frequencies of one hundred cycles per second and less; heat treatment variations characteristically produce modulating frequencies of approximately ten cycles per second and less; composition variations and variations in the temperature of the test material characteristically produce modulating frequencies of one cycle per second and less. The modulating frequencies are of course directly proportional to the scanning speed.

It has been found that the scanning device employed must be focused effectively on an area of the test material which is significantly narrower along the scanning direction than the larger of the two smallest characteristic dimensions to be distinguished. This is illustrated in FIGS. 2 and 3.

Figure 2:
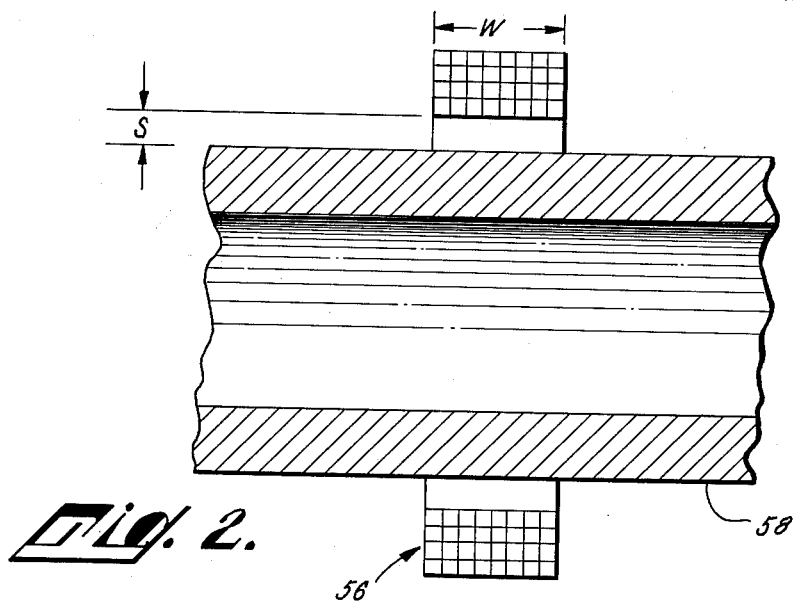
FIG. 2 is a schematic sectional elevation of a test coil surrounding a part being tested; and, FIG. 3 is a voltage-time diagram comparing responses obtained from test coils having different dimensions.

Referring to FIG. 2, a magnetically sensitive scanning device in the form of a test coil 56 is shown surrounding a metal tube 58. The width of the coil is represented by W, and the spacing between the windings of the coil and the tube is represented by the dimension S. Obviously, the larger the dimensions W or S, the wider will be the area on the tube on which the magnetic field of the coil is effectively focused. Similarly, the smaller the dimensions W and S, the narrower will be the area on which the magnetic field is predominantly focused.

Assume the tube 58 in FIG. 2 is a piece of stainless steel tubing which has been formed by rolling. Rolling and other forming operations normally leave residual stresses in the tube. These stress zones may have a characteristic dimension of about one-tenth to one-fourth inch along the length of the tube. Assume also that there is a hair-line crack in the tube having a characteristic dimension of about five-thousandths of an inch, and assume that the tube is to be rejected for hair-line cracks but not for residual stresses.

Figure 3:
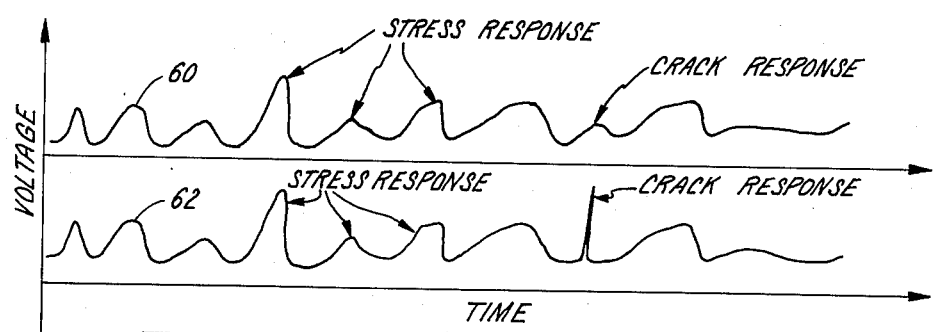

If the dimensions W and S are both on the order of one-fourth inch so that the field is focused on an area of the tube about one-fourth inch wide or a little greater, the modulating signal in the coil is then represented by the upper curve 60 in FIG. 3 wherein it can be seen that the crack response is practically indistinguishable from stress responses. There are no significant deflections on this trace shorter than one-fourth inch since the effective field width of the coil on the tube is about one-fourth inch. Thus the flaw, which occupies only a small fraction of the coil width as it passes through the coil, causes a weak deflection, whose width is also about one-fourth inch.

Assuming that the same piece of tubing is passed through a coil which is only about three-hundredths inches wide and which furthermore has a spacing of approximately three-hundredths inches or less, the modulating signal might appear such as shown in the bottom trace 62 of FIG. 3. The stresses produce about the same modulating frequencies as before since each stressed area has a characteristic dimension of the order of one-fourth inch of the length of the tube. But the response to the crack is now sharp having a width on the order of three-hundredths inches, the approximate width of the area on the tube on which the field of the coil predominately impinges.

What has been said above about distinguishing cracks from stresses, can also be said about other variables in the part being tested, such as heat treatment condition, composition, temperature, dimensions, etc. With a sufficiently narrow coil, or more precisely with a sufficiently focused field, responses to these variables can usually be distinguished. In all cases, the basic rule is that the scanning device must be focused effectively on an area of the test material which is significantly narrower in the scanning direction than the larger of the two smallest characteristic dimensions to be distinguished.

I claim:

1. Electromagnetic testing apparatus for disclosing non-uniformity in a test material and distinguishing between different types of non-uniformities having different characteristic dimensions in the material comprising means for subjecting the material to a magnetic field, a magnetically sensitive scanning device and cooperating electrical circuit for producing an electrical signal having an amplitude dependent upon the interaction between the test material and the magnetic field, the scanning device being focused effectively on an area of test material significantly narrower along the scanning direction than the larger of the two smallest characteristic dimensions to be distinguished, means for maintaining a predetermined scanning motion between the test material and the scanning device so that different types of non-uniformities in the test material introduce different predetermined frequencies in said electrical signal, selective means for filtering said signal so as to suppress certain of said predetermined frequencies, and means for indicating the filtered signal.

2. Apparatus of claim 1 wherein the filtering means has at least two parallel filtering channels for suppressing predetermined frequencies, and wherein the indicating means has separate indicating channels for receiving the output from the two filtering channels, whereby signals representative of different types of non-uniformities in the material under test may be indicated separately and at the same time.

3. Apparatus of claim 1 wherein the filtering means comprises a plurality of parallel filters for suppressing different frequencies, and switching means for selectively coupling the output of chosen filters to the indicating means.

4. Electromagnetic testing apparatus for resolving selected kinds of workpiece non-uniformities comprising means moving a workpiece past a detection position at a constant velocity, test coil means coupled with the workpiece at the detection position generating a composite signal of different frequency components respectively related directly to the rates of change of the magnitudes of the effects upon the search coil means produced by selected kinds of non-uniformities present in the workpiece, and a plurality of preselected band-pass filters coupled with said coil means predominantly suppressing certain of said different frequency components.

5. An electromagnetic testing system for resolving different kinds of non-uniformities in a metallic workpiece comprising a non-resonantly tuned test coil signal generating circuit including a test coil oriented substantially coaxial with said workpiece and having an effective scanning width less than the effective width of the next to the narrowest of the kinds of non-uniformities to be resolved, a plurality of different band-pass filter circuits, a plurality of switch means, and a multiple channel output indicator means, a different group of said filter circuits being coupled in parallel between said signal generating circuit and a respective one of said switch means, and each said switch means being coupled with a respective channel of said output indicator and being operable to couple a selected filter circuit in series between said signal generating circuit and a selected channel of said output indicator, whereby resolution of different kinds of non-uniformities is substantially automatically accomplished and such resolution may be perfected by differential comparison of outputs from said indicator.

References Cited in the file of this patent

UNITED STATES PATENTS

| | | |
|---|---|---|
| 1,782,462 | Chappuzeau et al. | Nov. 25, 1930 |
| 2,005,011 | Specht | June 18, 1935 |
| 2,203,256 | Drake | June 4, 1940 |
| 2,650,344 | Lloyd | Aug. 25, 1953 |